(12) United States Patent
Redaelli et al.

(10) Patent No.: US 12,327,050 B2
(45) Date of Patent: Jun. 10, 2025

(54) EMERGENCY DATA STORING OPERATION SELECTION

(71) Applicant: Micron Technology, Inc., Boise, ID (US)

(72) Inventors: Marco Redaelli, Munich (DE); Steffen Buch, Taufkirchen (DE)

(73) Assignee: Micron Technology, Inc., Boise, ID (US)

( * ) Notice: Subject to any disclaimer, the term of this patent is extended or adjusted under 35 U.S.C. 154(b) by 33 days.

(21) Appl. No.: 18/511,484

(22) Filed: Nov. 16, 2023

(65) Prior Publication Data
US 2024/0176548 A1   May 30, 2024

Related U.S. Application Data

(60) Provisional application No. 63/385,435, filed on Nov. 30, 2022.

(51) Int. Cl.
*G06F 3/06* (2006.01)
*G06F 1/30* (2006.01)

(52) U.S. Cl.
CPC ............... *G06F 3/0659* (2013.01); *G06F 1/30* (2013.01); *G06F 3/0604* (2013.01); *G06F 3/0619* (2013.01); *G06F 3/0673* (2013.01)

(58) Field of Classification Search
None
See application file for complete search history.

(56) References Cited

U.S. PATENT DOCUMENTS 9,721,660 B2 * 8/2017 Kelly .................. G06F 11/1441

* cited by examiner

*Primary Examiner* — Charles J Choi
(74) *Attorney, Agent, or Firm* — Harrity & Harrity, LLP

(57) ABSTRACT

Implementations described herein relate to emergency data storing operation selection. In some implementations, a memory device may be configured to receive a peripheral component interconnect power loss notification (PLN) signal and a peripheral component interconnect express reset (PERST) signal. The memory device may be configured to determine whether to initiate a first data storing operation or a second data storing operation based on the PERST signal state based on a falling edge of the PLN signal. The memory device may be configured to selectively initiate the first data storing operation or the second data storing operation. The first data storing operation may include storing data associated with the memory device prior to the memory device experiencing a power loss, and the second data storing operation may include storing data and metadata associated with the memory device prior to the memory device experiencing the power loss.

20 Claims, 6 Drawing Sheets

EMERGENCY DATA STORING OPERATION SELECTION

CROSS-REFERENCE TO RELATED APPLICATION

This patent application claims priority to U.S. Provisional Patent Application No. 63/385,435, filed on Nov. 30, 2022, entitled "EMERGENCY DATA STORING OPERATION SELECTION," and assigned to the assignee hereof. The disclosure of the prior Application is considered part of and is incorporated by reference into this patent application.

TECHNICAL FIELD

The present disclosure generally relates to memory devices, memory device operations, and, for example, to emergency data storing operation selection.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
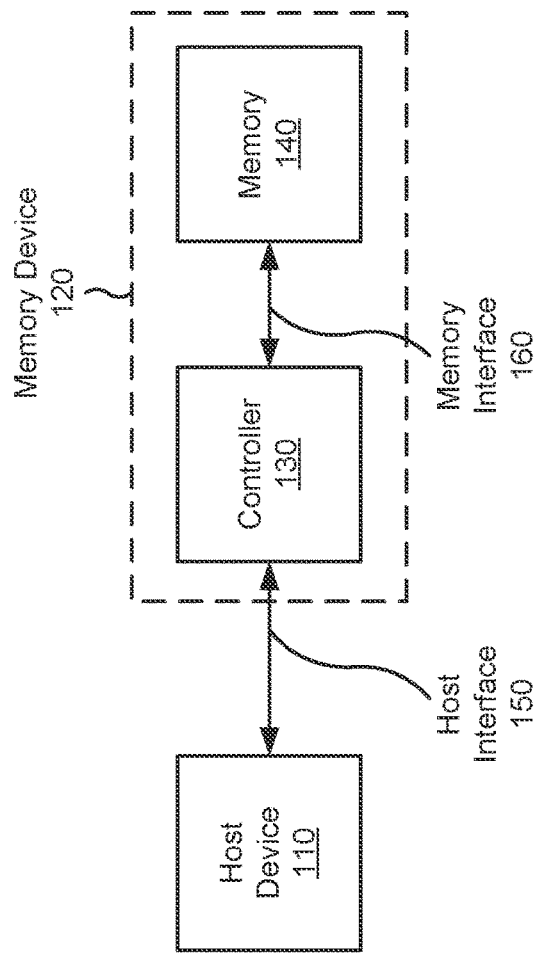
FIG. 1 is a diagram illustrating an example system capable of emergency data storing operation selection.

A memory device may experience a low battery condition and/or a power loss condition. The low battery condition of the memory device may occur when a battery that is providing power to the memory device is in a low power state. For example, a cellular phone may include a memory device and a battery that provides power to the memory device. The memory device may experience a low battery condition when a charge of the battery is less than a threshold, such as less than ten percent, less than five percent, or less than two percent, among other examples. The power loss condition of the memory device may occur when the charge of the battery is zero percent or close to zero percent. For example, a memory device that is experiencing a low battery condition may experience a power loss condition if the battery that is powering the memory device (and/or other components) continues to be used. Alternatively, the power loss condition may occur when the battery becomes disconnected from the memory device. For example, when a vehicle that includes a battery and a memory device crashes, the battery may become disconnected from the memory device, and the memory device may no longer receive power from the battery.

A memory device experiencing the low battery condition or the power loss condition may perform an emergency storing operation to prevent data loss. In some cases, the emergency storing operation may be an emergency power fail (EPF) operation. In this case, the memory device may store data (such as in-flight data) prior to a power loss acknowledgement (PLA) signal being asserted, but may not store metadata (such as logical block address (LBA) information) prior to the PLA being asserted. This may require a longer boot-up time during a next powering on of the memory device, for example, to enable the memory device to recover the metadata. In some cases, the emergency storing operation may a forced quiescence (FQ) operation. In this case, the memory device may store both data and metadata prior to the PLA being asserted, and the memory device may not need the longer boot-up time at the next powering on of the memory device. The memory device may use power from one or more capacitors associated with the memory device to perform the EPF operation or the FQ operation. In some cases, a register setting may indicate which emergency storing operation is to be used. For example, a first bit of the register may indicate for the memory device to use the EPF operation to store the data prior to a memory device shut-down, and a second bit of the register may indicate for the memory device to use the FQ operation to store the data and the associated metadata prior to the memory device shut-down.

In some cases, it may not be desirable for the memory device to use the EPF operation due to the longer boot-up times associated with the EPF operation, particularly when there is enough time for an FQ operation to be performed. For example, a user of the automobile may not be able to wait a time period for the memory device to recover the metadata upon a next powering on of the memory device prior to being able to drive the automobile. In some cases, protocol level commands may be used to control or manage the emergency storing operations. For example, the system may include a power management integrated circuit (PMIC) triggering a power loss management interrupt routine, a host system-on-chip (SOC) executing an interrupt service routine, and a memory controller serving a non-volatile memory express (NVMe) command associated with the emergency storing operation into a command queue. This may result in additional delays for the memory device with respect to storing the data and/or the metadata. In some cases, a design architecture of the PMIC may result in the host SOC being powered off during an APL to maximize a power hold-off time for preventing data corruption. However, there is currently no method that enables the memory device to control (e.g., using hardware signals) which emergency storing operation is to be performed based on a low battery condition or a power loss condition, such as based on detection of a power loss notification (PLN) signal.

In some implementations, the memory device may be configured to select the emergency storing operation that is to be performed based on detection of the PLN signal. For example, the memory device may receive a peripheral component interconnect PLN signal and a peripheral component interconnect express reset (PERST) signal. The PLN signal may be received by the memory device from a power management component. The PERST signal may be received by the memory device from a logic component. For example, the logic component may output the PERST signal based on an EPF input and a PERST input to the logic component. The memory device may initiate the EPF operation or the FQ operation based on the PERST signal. The PERST signal may be sampled on a falling edge of the PLN signal. For example, the memory device may initiate the EPF operation based on the PLN signal transitioning to a low state and the PERST signal being in a low state. Alternatively, the memory device may initiate the FQ based on the PLN signal transitioning to a low state, the PERST signal being in a high state, and the PERST input being in a high state. As a result, the memory device may attempt to initiate the FQ operation whenever possible, such as when there is sufficient time for the FQ operation to be performed. This may enable the memory device to store data and metadata prior to the memory device experiencing a power loss, thereby preventing a longer a boot-up time during a next powering on of the memory device.

FIG. 1 is a diagram illustrating an example system 100 capable of emergency data storing operation selection. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some implementations, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 may be configured to receive a peripheral component interconnect power loss notification (PLN) signal and a peripheral component interconnect express reset (PERST) signal, wherein the PERST signal is output from a logic component to the memory device based on an emergency power fail input and a PERST input; determine whether to initiate a first data storing operation or a second data storing operation based on the PERST signal, wherein the PERST signal is sampled on a falling edge of the PLN signal; and selectively initiate the first data storing operation or the second data storing operation, wherein the first data storing operation includes storing data associated with the memory device prior to the memory device experiencing a power loss, and the second data storing operation includes storing data and metadata associated with the memory device prior to the memory device experiencing the power loss.

In some implementations, a power management component may be configured to: detect a power loss condition associated with a memory device; and transmit a peripheral component interconnect power loss notification (PLN) signal to the memory device; a logic component may be configured to: receive an emergency power fail input and a peripheral component interconnect express reset (PERST) input; and output a PERST signal based on the emergency power fail input and the PERST input; and a memory device may be configured to: receive the PLN signal and the PERST signal; and selectively initiate a first data storing operation or a second data storing operation based on the PERST signal, wherein the PERST signal is sampled on a falling edge of the PLN signal, and wherein the first data storing operation includes storing data associated with the memory device prior to the memory device experiencing a power loss, and the second data storing operation includes storing data and metadata associated with the memory device prior to the memory device experiencing the power loss.

In some implementations, the memory device 120 may be configured to receive a peripheral component interconnect power loss notification (PLN) signal and a peripheral component interconnect express reset (PERST) signal, wherein the PERST signal is output from a logic component to the memory device based on an emergency power fail input and a PERST input; determine whether to initiate an emergency power fail operation or a forced quiescence operation based on the PERST signal, wherein the PERST signal is sampled on a falling edge of the PLN signal; and initiate the emergency power fail operation or the forced quiescence operation.

As indicated above, FIG. 1 is provided as an example. Other examples may differ from what is described with regard to FIG. 1.

Figure 2:
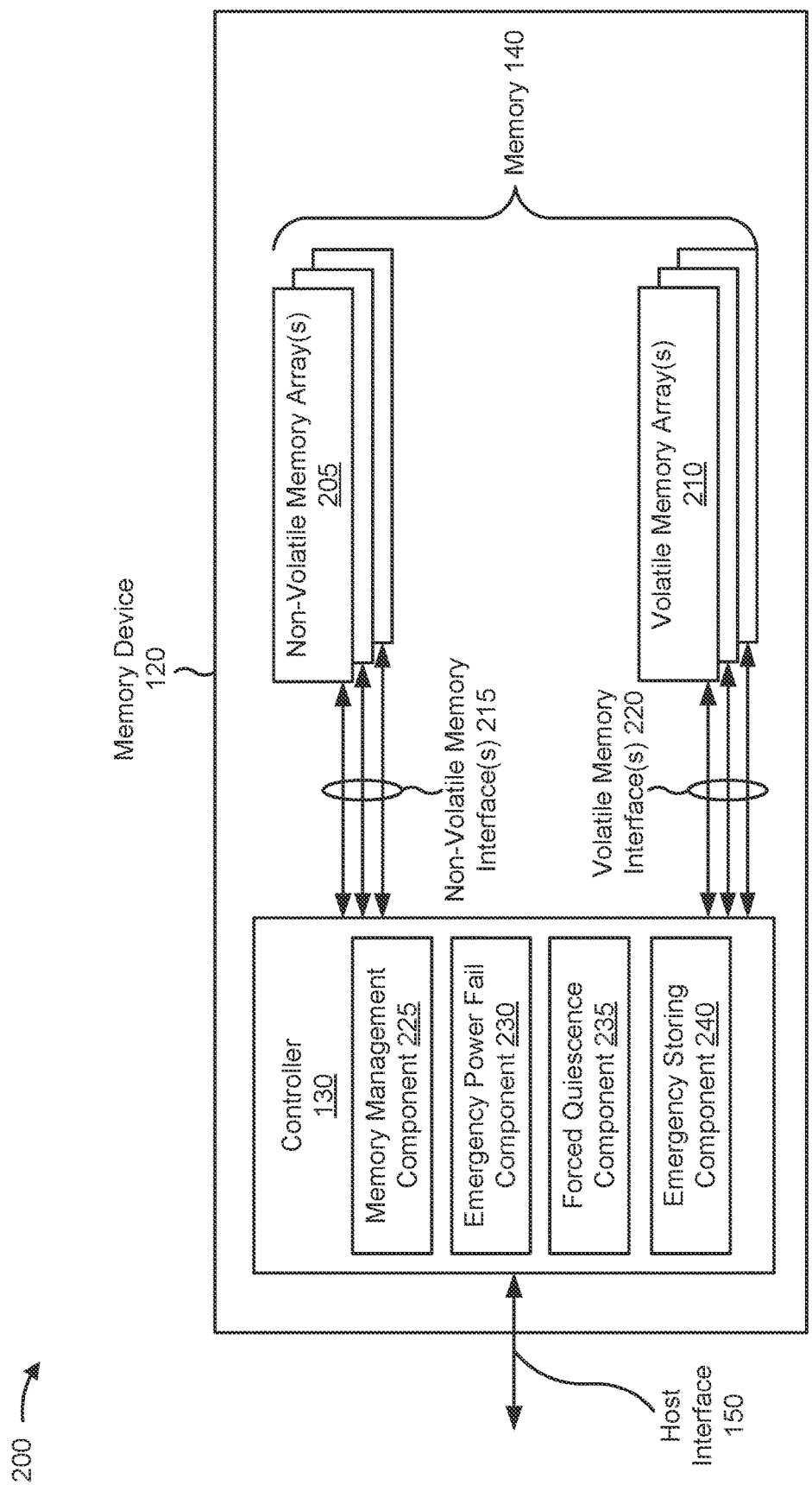
FIG. 2 is a diagram of example components included in a memory device.

FIG. 2 is a diagram of example 200 components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, an EPF component 230, an FQ component 235, and/or an emergency storing component 240. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The EPF component 230 may be configured to perform a first emergency storing operation such as an EPF operation. The EPF operation may include storing memory device data such as in-flight memory device data. The EPF operation may not include storing memory device metadata, or may include storing only a portion of the memory device metadata. The EPF operation may include storing the data prior to the memory device 120 experiencing a power loss (e.g., prior to the memory device being powered down). Additionally, or alternatively, the EPF operation may include storing the data prior to the memory device 120 asserting a PLA signal. The EPF operation may result in a longer boot-up time during a next powering on of the memory device 120. For example, the memory device 120 may need to store and/or manage the metadata in the memory device 120 prior to the memory device 120 being available for use.

The FQ component 235 may be configured to perform a second emergency storing operation such as an FQ operation. The FQ operation may include storing memory device data (such as in-flight data) and memory device metadata. The FQ operation may include storing the data and the metadata prior to the memory device experiencing a power loss (e.g., prior to the memory device being powered down). Additionally, or alternatively, the FQ operation may include storing the data and the metadata prior to the memory device 120 asserting a PLA signal. The FQ operation may result in a normal boot-up time the next time the memory device is powered on. For example, the memory device 120 may not need to store and/or manage the metadata in the memory device 120 prior to the memory device being available for use.

The emergency storing component 240 may be configured to store memory device data (and/or metadata) based on the memory device 120 performing the EPF operation, the FQ operation, or both the EPF operation and the FQ operation. In some implementations, the emergency storing component 240 may determine whether the memory device 120 is to perform the EPF operation, the FQ operation, or both the EPF operation and the FQ operation based on one or more inputs, such as an EPF input, a PLN input, and a PERST input. In some other implementations, the emergency storing component 240 may perform (or attempt to perform) both the EPF operation and the FQ operation.

One or more devices or components shown in FIG. 2 may be configured to perform operations described elsewhere herein, such as one or more operations and/or methods described in connection with FIGS. 4, 5A and 5B. For example, the controller 130, the memory management component 225, the EPF component 230, the FQ component 235, and/or the emergency storing component 240 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
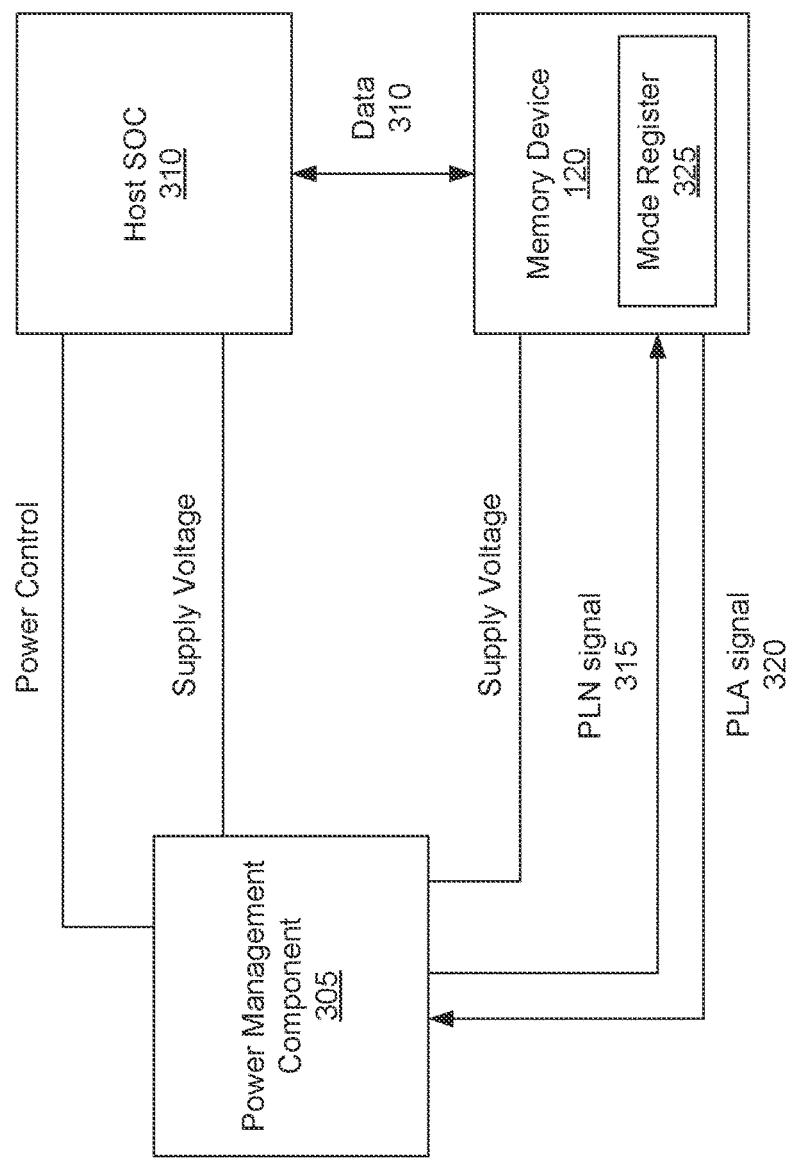
FIG. 3 is a diagram illustrating an example of emergency data storing.

FIG. 3 is a diagram illustrating an example 300 of emergency data storing. A host SOC 310 may write data to the memory device 120 and/or may read data from the memory device 120. A power management component 305 may provide power control to the host SOC 310 and/or may provide a supply voltage to the host SOC 310. Additionally, or alternatively, the power management component 305 may provide a supply voltage to the memory device 120. In some cases, the power management component 305 may assert a PLN signal 315 to indicate a power loss condition associated with the memory device 120. For example, the power management component 305 may assert the PLN signal 315 based on the memory device 120 experiencing a low battery condition or a disconnected battery condition. In some cases, the memory device 120 may be configured to assert a PLA signal 320. The PLA signal 320 may indicate to the power management component 305 that the memory device 120 has completed an EPF operation or an FQ operation.

In some cases, the memory device 120 may include a mode register 325. The mode register 325 may indicate whether the memory device 120 is to perform the EPF operation or the FQ operation. For example, a first state (such as a low state) may indicate that the memory device 120 is to perform the EPF operation and a second state (such as a high state) may indicate that the memory device 120 is to perform the FQ operation. When the memory device 120 detects the PLN signal 315, the memory device 120 may perform an emergency storing operation based on a status of the mode register 325. For example, the memory device 120 may detect the PLN signal 315 and may perform the EPF operation based on the mode register 325 being in the low state. Alternatively, the memory device 120 may detect the PLN signal 315 and may perform the FQ operation based on the mode register 325 being in the high state. As described herein, the EPF operation may result in a longer boot-up time during a next powering on of the memory device 120.

As indicated above, FIG. 3 is provided as an example. Other examples may differ from what is described with regard to FIG. 3.

Figure 4:
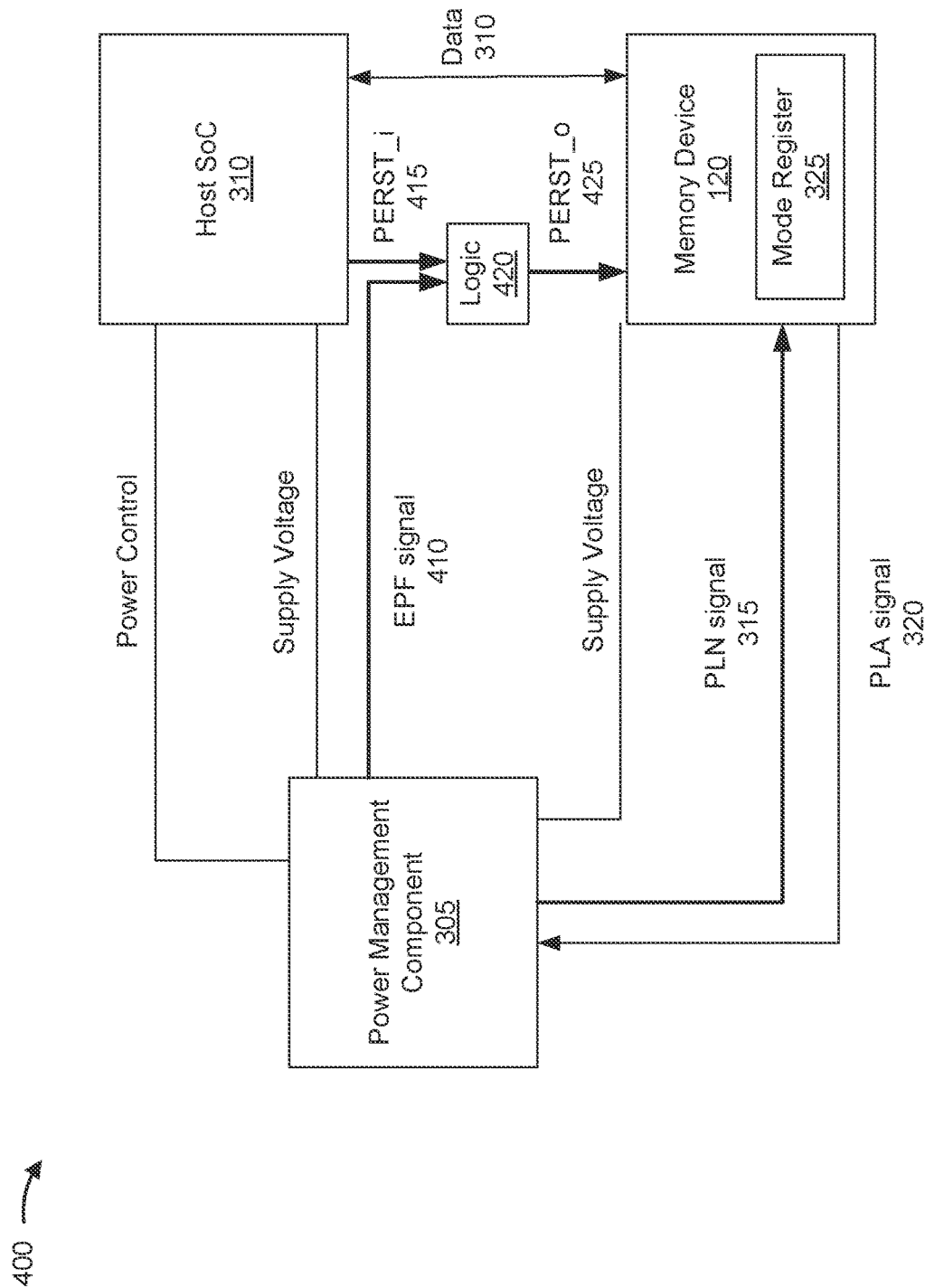
FIG. 4 is a diagram illustrating an example of emergency data storing operation selection.

FIG. 4 is a diagram illustrating an example 400 of emergency data storing operation selection. As described herein, the power management component 305 may assert the PLN signal 315 to indicate a power loss condition associated with the memory device 120. The power management component 305 may assert the PLN signal 315 based on the memory device 120 experiencing a low battery condition or a disconnected battery condition.

In some implementations, the power management component 305 may assert an EPF signal 410. The power management component 305 may assert the EPF signal 410 based on detecting the low battery condition or the disconnected battery condition. The EPF signal 410 may indicate for the memory device 120 to perform an emergency storing operation such as an EPF operation. The EPF signal may be an active low signal.

In some implementations, the host SOC 310 may assert PERST_i 415. The PERST_i 415 may be received as an input by logic 420. The logic 420 may include one or more logic gates, such as AND gates, OR gates, NAND gates, NOR gates, and/or XOR gates, among other examples. The logic 420 may perform one or more logic operations based on the EPF signal 410 and the PERST_i 415. In some implementations, the logic 420 may output PERST_o 425 based on the EPF signal 410 and the PERST_i 415. The PERST_o may be referred to as the "PERST signal" whereas the PERST_i may be referred to as the PERST input. The memory device 120 may perform an emergency data storing operation (such as the EPF operation or the FQ operation) based on two or more of the PLN signal 315, the EPF signal 410, the PERST_i 415, and the PERST_o 425. Some examples are shown in Table 1.

TABLE 1

| PLN | PERST_i | EPF | PERST_o | Comment |
|---|---|---|---|---|
| 1→0 | 0 | 0 | 0 | Device in reset<br>PLN shutdown request<br>Ignore PLN |
| 1→0 | 0 | 1 | 0 | Device in reset<br>PLN shutdown request<br>Ignore PLN |
| 1→0 | 1 | 0 | 0 | Normal operation<br>PLN shutdown request |

TABLE 1-continued

| PLN | PERST_i | EPF | PERST_o | Comment |
|---|---|---|---|---|
| | | | | EPF asserted |
| | | | | Execute EPF |
| 1→0 | 1 | 1 | 1 | Normal operation |
| | | | | PLN shutdown request |
| | | | | EPF not asserted |
| | | | | Execute FQ |
| 1 | 0 | 0 | 0 | Device in reset |
| | | | | No PLN shutdown request |
| | | | | (invalid EPF) |
| 1 | 0 | 1 | 0 | Device in reset |
| | | | | No PLN shutdown request |
| 1 | 1 | 0 | 1 | Normal operation |
| | | | | No PLN shutdown request |
| | | | | (invalid EPF) |
| 1 | 1 | 1 | 1 | Normal operation |
| | | | | No PLN shutdown request |

In a first example, the logic 420 may output PERST_o 425 having a low state based on the PERST_i 415 being in a low state, the EPF signal 410 being in a low state, and the PLN signal 315 transitioning to a low state. The PERST_o 425 may be sampled on the falling edge of the PLN signal 315 (e.g., when the PLN signal is asserted). Thus, the PERST_i 415 may be in a low state, the EPF signal 410 may be in a low state, the PLN signal 315 may be transitioning to a low state, and the PERST_o 425 may be in a low state. In this case, the PLN signal 315 is asserted, but the memory device 120 is in a reset mode. Thus, the memory device 120 may ignore the PLN signal 315.

In a second example, the logic 420 may output PERST_o 425 having a low state based on the PERST_i 415 being in a low state, the EPF signal 410 being in a high state, and the PLN signal 315 transitioning to a low state. The PERST_o 425 may be sampled on the falling edge of the PLN signal 315 (e.g., when the PLN signal is asserted). Thus, the PERST_i 415 may be in a low state, the EPF signal 410 may be in a high state, the PLN signal 315 may be transitioning to a low state, and the PERST_o 425 may be in a low state. In this case, the PLN signal 315 is asserted, but the memory device 120 is in a reset mode. Thus, the memory device 120 may ignore the PLN signal 315.

In a third example, the logic 420 may output PERST_o 425 having a low state based on the PERST_i 415 being in a high state, the EPF signal 410 being in a low state, and the PLN signal 315 transitioning to a low state. The PERST_o 425 may be sampled on the falling edge of the PLN signal 315 (e.g., when the PLN signal is asserted). Thus, the PERST_i 415 may be in a high state, the EPF signal 410 may be in a low state, the PLN signal 315 may be transitioning to a low state, and the PERST_o 425 may be in a low state. In this case, the memory device 120 is in a normal operation mode and may initiate the EPF operation based on the EPF signal 410 being in a low (active) state.

In a fourth example, the logic 420 may output PERST_o 425 having a high state based on the PERST_i 415 being in a high state, the EPF signal 410 being in a high state, and the PLN signal 315 transitioning to a low state. The PERST_o 425 may be sampled on the falling edge of the PLN signal 315 (e.g., when the PLN signal is asserted). Thus, the PERST_i 415 may be in a high state, the EPF signal 410 may be in a high state, the PLN signal 315 may be transitioning to a low state, and the PERST_o 425 may be in a high state. In this case, the memory device 120 is in a normal operation mode and may initiate the FQ operation based on the EPF signal 410 being in a high (inactive) state.

In a fifth example, the logic 420 may output PERST_o 425 having a low state based on the PERST_i 415 being in a low state, the EPF signal 410 being in a low state, and the PLN signal 315 being in a high state. Thus, the PERST_i 415 may be in a low state, the EPF signal 410 may be in a low state, the PLN signal 315 may be in a high state, and the PERST_o 425 may be in a low state. In this case, the memory device 120 is in a reset mode and the PLN signal 315 is not asserted. Thus, the memory device 120 may ignore the EPF signal 410 (for example, the EPF signal 410 is considered to be invalid).

In a sixth example, the logic 420 may output PERST_o 425 having a low state based on the PERST_i 415 being in a low state, the EPF signal 410 being in a high state, and the PLN signal 315 being in a high state. Thus, the PERST_i 415 may be in a low state, the EPF signal 410 may be in a high state, the PLN signal 315 may be in a high state, and the PERST_o 425 may be in a low state. In this case, the memory device 120 is in a reset mode, and a PLN shutdown is not initiated.

In a seventh example, the logic 420 may output PERST_o 425 having a high state based on the PERST_i 415 being in a high state, the EPF signal 410 being in a low state, and the PLN signal 315 being in a high state. Thus, the PERST_i 415 may be in a high state, the EPF signal 410 may be in a low state, the PLN signal 315 may be in a high state, and the PERST_o 425 may be in a high state. In this case, the memory device 120 is in a normal operation, but the PLN shutdown is not initiated (for example, the EPF signal 410 is considered to be invalid).

In an eight example, the logic 420 may output PERST_o 425 having a high state based on the PERST_i 415 being in a high state, the EPF signal 410 being in a high state, and the PLN signal 315 being in a high state. Thus, the PERST_i 415 may be in a high state, the EPF signal 410 may be in a high state, the PLN signal 315 may be in a high state, and the PERST_o 425 may be in a high state. In this case, the memory device 120 is in a normal operation, but the PLN shutdown is not initiated (for example, the EPF signal 410 is considered to be invalid).

In some implementations, the memory device 120 may perform a data storing operation based on the EPF signal 410, the PLN signal 315, and the PERST_o 425. For example, the memory device 120 may perform an EPF data storing operation based on the EPF signal 410 being in a low state, the PLN signal 315 being in a low state, and the PERST_o being in a low state. Alternatively, the memory device 120 may perform an FQ data storing operation based on the EPF signal 410 being in a high state, the PLN signal 315 being in a low state, and the PERST_o being in the high state. This may result in the memory device 120 performing the FQ operation when possible, and performing the EPF operation only when necessary. This may result in reduced boot-up times for the memory device 120. In some implementations, the memory device 120 may perform the EPF operation or the FQ operation based on power received from one or more capacitors, such as the capacitors described in connection with FIG. 6.

As indicated above, FIG. 4 is provided as an example. Other examples may differ from what is described with regard to FIG. 4.

Figure 5:
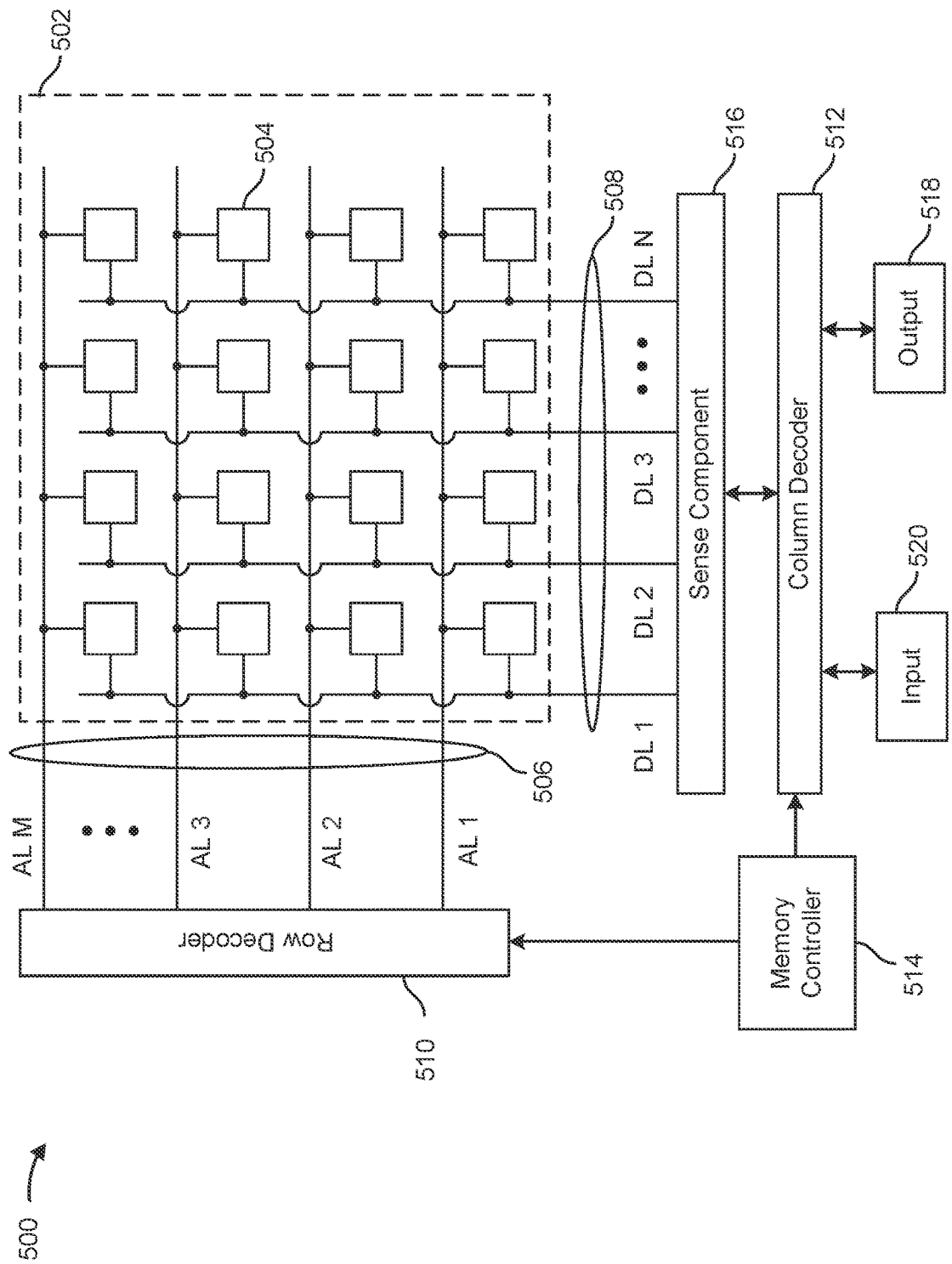
FIG. 5 is a diagrammatic view of an example memory device.

FIG. 5 is a diagrammatic view of an example memory device 500. The memory device 500 may include a memory array 502 that includes multiple memory cells 504. A memory cell 504 is programmable or configurable into a data state of multiple data states (e.g., two or more data states). For example, a memory cell 504 may be set to a particular data state at a particular time, and the memory cell 504 may be set to another data state at another time. A data state may correspond to a value stored by the memory cell 504. The value may be a binary value, such as a binary 0 or a binary 1, or may be a fractional value, such as 0.5, 1.5, or the like. A memory cell 504 may include a capacitor to store a charge representative of the data state. For example, a charged and an uncharged capacitor may represent a first data state and a second data state, respectively. As another example, a first level of charge (e.g., fully charged) may represent a first data state, a second level of charge (e.g., fully discharged) may represent a second data state, a third level of charge (e.g., partially charged) may represent a third data state, and so on.

Operations such as reading and writing (i.e., cycling) may be performed on memory cells 504 by activating or selecting the appropriate access line 506 (shown as access lines AL 1 through AL M) and digit line 508 (shown as digit lines DL 1 through DL N). An access line 506 may also be referred to as a "row line" or a "word line," and a digit line 508 may also be referred to a "column line" or a "bit line." Activating or selecting an access line 506 or a digit line 508 may include applying a voltage to the respective line. An access line 506 and/or a digit line 508 may comprise, consist of, or consist essentially of a conductive material, such as a metal (e.g., copper, aluminum, gold, titanium, or tungsten) and/or a metal alloy, among other examples. In FIG. 5, each row of memory cells 504 is connected to a single access line 506, and each column of memory cells 504 is connected to a single digit line 508. By activating one access line 506 and one digit line 508 (e.g., applying a voltage to the access line 506 and digit line 508), a single memory cell 504 may be accessed at (e.g., is accessible via) the intersection of the access line 506 and the digit line 508. The intersection of the access line 506 and the digit line 508 may be called an "address" of a memory cell 504.

In some implementations, the logic storing device of a memory cell 504, such as a capacitor, may be electrically isolated from a corresponding digit line 508 by a selection component, such as a transistor. The access line 506 may be connected to and may control the selection component. For example, the selection component may be a transistor, and the access line 506 may be connected to the gate of the transistor. Activating the access line 506 results in an electrical connection or closed circuit between the capacitor of a memory cell 504 and a corresponding digit line 508. The digit line 508 may then be accessed (e.g., is accessible) to either read from or write to the memory cell 504.

A row decoder 510 and a column decoder 512 may control access to memory cells 504. For example, the row decoder 510 may receive a row address from a memory controller 514 and may activate the appropriate access line 506 based on the received row address. Similarly, the column decoder 512 may receive a column address from the memory controller 514 and may activate the appropriate digit line 508 based on the column address.

Upon accessing a memory cell 504, the memory cell 504 may be read (e.g., sensed) by a sense component 516 to determine the stored data state of the memory cell 504. For example, after accessing the memory cell 504, the capacitor of the memory cell 504 may discharge onto its corresponding digit line 508. Discharging the capacitor may be based on biasing, or applying a voltage, to the capacitor. The discharging may induce a change in the voltage of the digit line 508, which the sense component 516 may compare to a reference voltage (not shown) to determine the stored data state of the memory cell 504. For example, if the digit line 508 has a higher voltage than the reference voltage, then the sense component 516 may determine that the stored data state of the memory cell 504 corresponds to a first value, such as a binary 1. Conversely, if the digit line 508 has a lower voltage than the reference voltage, then the sense component 516 may determine that the stored data state of the memory cell 504 corresponds to a second value, such as a binary 0. The detected data state of the memory cell 504 may then be output (e.g., via the column decoder 512) to an output component 518 (e.g., a data buffer). A memory cell 504 may be written (e.g., set) by activating the appropriate access line 506 and digit line 508. The column decoder 512 may receive data, such as input from input component 520, to be written to one or more memory cells 504. A memory cell 504 may be written by applying a voltage across the capacitor of the memory cell 504.

The memory controller 514 may control the operation (e.g., read, write, re-write, refresh, and/or recovery) of the memory cells 504 via the row decoder 510, the column decoder 512, and/or the sense component 516. The memory controller 514 may generate row address signals and column address signals to activate the desired access line 506 and digit line 508. The memory controller 514 may also generate and control various voltages used during the operation of the memory array 502.

As indicated above, FIG. 5 is provided as an example. Other examples may differ from what is described with respect to FIG. 5.

Figure 6:
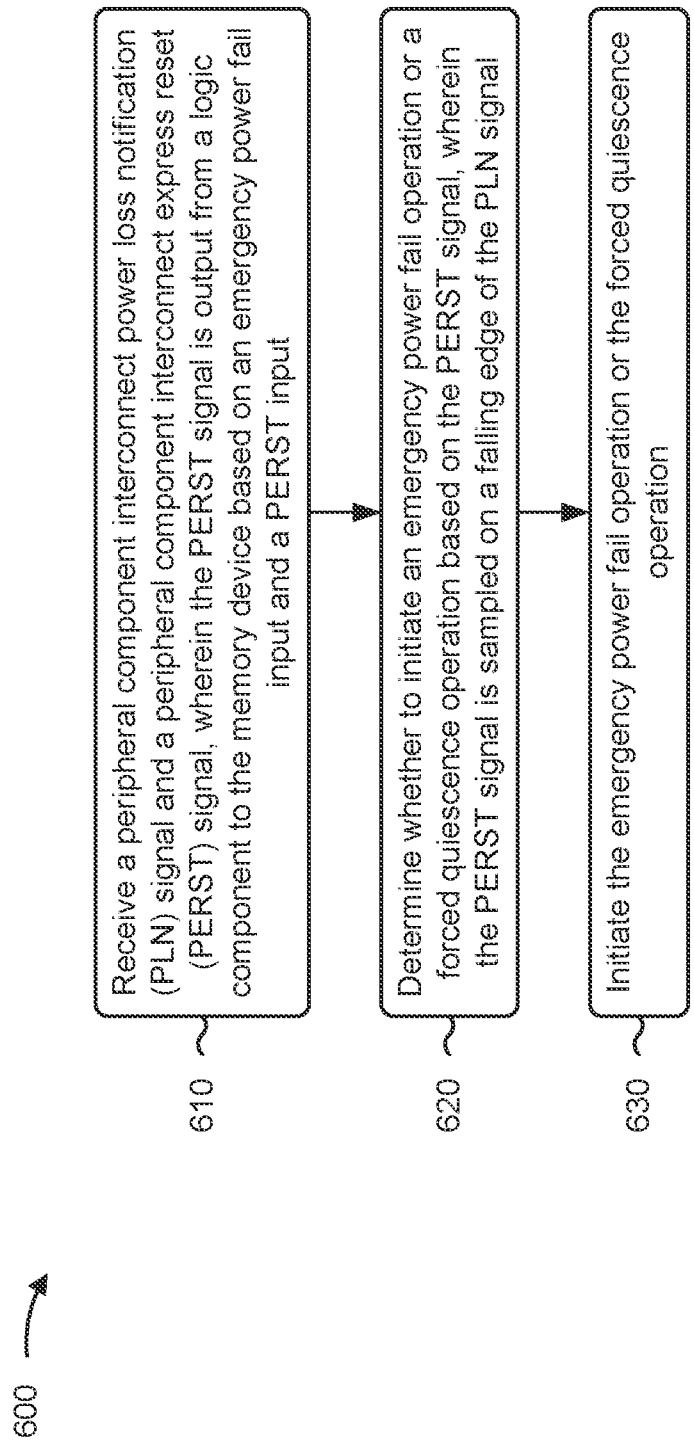
FIG. 6 is a flowchart of an example method associated with emergency data storing operation selection.

FIG. 6 is a flowchart of an example method 600 associated with emergency data storing operation selection. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, the emergency power fail component 230, the forced quiescence component 235, and/or the emergency data storing component 240) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include receiving a peripheral component interconnect power loss notification (PLN) signal and a peripheral component interconnect express reset (PERST) signal, wherein the PERST signal is output from a logic component to the memory device based on an emergency power fail input and a PERST input (block 610). As further shown in FIG. 6, the method 600 may include determining whether to initiate an emergency power fail operation or a forced quiescence operation based on the PERST signal, wherein the PERST signal is sampled on a falling edge of the PLN signal (block 620). As further shown in FIG. 6, the method 600 may include initiating the emergency power fail operation or the forced quiescence operation (block 630).

The method 600 may include additional aspects, such as any single aspect or any combination of aspects described below and/or described in connection with one or more other methods or operations described elsewhere herein.

In a first aspect, initiating the emergency power fail operation comprises storing data associated with the memory device prior to the memory device experiencing a power loss, and initiating the forced quiescence operation includes storing data and metadata associated with the memory device prior to the memory device experiencing the power loss.

In a second aspect, alone or in combination with the first aspect, initiating the emergency power fail operation or the forced quiescence operation comprises initiating the emergency power fail operation based on the PLN signal transitioning to a low state and the PERST signal being in a low state.

In a third aspect, alone or in combination with one or more of the first and second aspects, initiating the emergency power fail operation or the forced quiescence operation comprises initiating the forced quiescence operation based on the PLN signal transitioning to a low state, the PERST signal being in a high state, and the PERST input being in a high state.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a memory device includes one or more components configured to: receive a peripheral component interconnect power loss notification (PLN) signal and a peripheral component interconnect express reset (PERST) signal, wherein the PERST signal is output from a logic component to the memory device based on an emergency power fail input and a PERST input; determine whether to initiate a first data storing operation or a second data storing operation based on the PERST signal, wherein the PERST signal is sampled on a falling edge of the PLN signal; and selectively initiate the first data storing operation or the second data storing operation, wherein the first data storing operation includes storing data associated with the memory device prior to the memory device experiencing a power loss, and the second data storing operation includes storing data and metadata associated with the memory device prior to the memory device experiencing the power loss.

In some implementations, a system comprising: a power management component configured to: detect a power loss condition associated with a memory device; and transmit a peripheral component interconnect power loss notification (PLN) signal to the memory device; a logic component configured to: receive an emergency power fail input and a peripheral component interconnect express reset (PERST) input; and output a PERST signal based on the emergency power fail input and the PERST input; and the memory device, wherein the memory device is configured to: receive the PLN signal and the PERST signal; and selectively initiate a first data storing operation or a second data storing operation based on the PERST signal, wherein the PERST signal is sampled on a falling edge of the PLN signal, and wherein the first data storing operation includes storing data associated with the memory device prior to the memory device experiencing a power loss, and the second data storing operation includes storing data and metadata associated with the memory device prior to the memory device experiencing the power loss.

In some implementations, a method performed by a memory device includes receiving a peripheral component interconnect power loss notification (PLN) signal and a peripheral component interconnect express reset (PERST) signal, wherein the PERST signal is output from a logic component to the memory device based on an emergency power fail input and a PERST input; determining whether to initiate an emergency power fail operation or a forced quiescence operation based on the PERST signal, wherein the PERST signal is sampled on a falling edge of the PLN signal; and initiating the emergency power fail operation or the forced quiescence operation.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:
1. A memory device, comprising:
one or more components configured to:
receive a peripheral component interconnect power loss notification (PLN) signal and a peripheral component interconnect express reset (PERST) signal, wherein the PERST signal is output from a logic component to the memory device based on an emergency power fail input and a PERST input;
determine whether to initiate a first data storing operation or a second data storing operation based on the PERST signal,
wherein the PERST signal is sampled on a falling edge of the PLN signal; and
selectively initiate the first data storing operation or the second data storing operation,
wherein the first data storing operation includes storing data associated with the memory device prior to the memory device experiencing a power loss, and the second data storing operation includes storing data and metadata associated with the memory device prior to the memory device experiencing the power loss.

2. The memory device of claim 1, wherein the first data storing operation is an emergency power fail operation and the second data storing operation is a forced quiescence operation.

3. The memory device of claim 1, wherein the one or more components, to selectively initiate the first data storing operation or the second data storing operation, are configured not to initiate the first data storing operation or the second data storing operation based on the PLN signal transitioning to a low state and the PERST signal being in a low state.

4. The memory device of claim 1, wherein the one or more components, to selectively initiate the first data storing operation or the second data storing operation, are configured to initiate the first data storing operation based on the PLN signal transitioning to a low state, the PERST signal being in a low state, and the PERST input being in a high state.

5. The memory device of claim 1, wherein the one or more components, to selectively initiate the first data storing operation or the second data storing operation, are configured to initiate the second data storing operation based on the PLN signal transitioning to a low state, the PERST signal being in a high state, and the PERST input being in a high state.

6. The memory device of claim 1, wherein the one or more components, to selectively initiate the first data storing operation or the second data storing operation, are configured not to initiate the first data storing operation or the second data storing operation based on the PLN signal being in a high state and the PERST signal being in a low state.

7. The memory device of claim 1, wherein the one or more components, to selectively initiate the first data storing operation or the second data storing operation, are configured not to initiate the first data storing operation or the second data storing operation based on the PLN signal being in a high state and the PERST signal being in a high state.

8. The memory device of claim 1, wherein the PERST signal is in a high state based on the PERST input being in a high state and the emergency power fail input being in a high state, or based on the PERST input being in a high state, the emergency power fail input being in a low state, and the PLN signal being in a high state.

9. The memory device of claim 1, wherein the one or more components are configured to perform the first data storing operation or the second data storing operation using power received from one or more capacitors associated with the memory device.

10. A system comprising:
a power management component configured to:
detect a power loss condition associated with a memory device; and
transmit a peripheral component interconnect power loss notification (PLN) signal to the memory device;
a logic component configured to:
receive an emergency power fail input and a peripheral component interconnect express reset (PERST) input; and
output a PERST signal based on the emergency power fail input and the PERST input; and
the memory device, wherein the memory device is configured to:
receive the PLN signal and the PERST signal; and
selectively initiate a first data storing operation or a second data storing operation based on the PERST signal,
wherein the PERST signal is sampled on a falling edge of the PLN signal, and
wherein the first data storing operation includes storing data associated with the memory device prior to the memory device experiencing a power loss, and the second data storing operation includes storing data and metadata associated with the memory device prior to the memory device experiencing the power loss.

11. The system of claim 10, wherein the first data storing operation is an emergency power fail operation and the second data storing operation is a forced quiescence operation.

12. The system of claim 10, wherein the power management component, to detect the power loss condition associated with the memory device, is configured to detect a low battery condition or a disconnected battery condition.

13. The system of claim 10, wherein the memory device, to selectively initiate the first data storing operation or the second data storing operation, are configured not to initiate the first data storing operation or the second data storing operation based on the PLN signal transitioning to a low state and the PERST signal being in a low state.

14. The system of claim 10, wherein the memory device, to selectively initiate the first data storing operation or the second data storing operation, are configured to initiate the first data storing operation based on the PLN signal transitioning to a low state, the PERST signal being in a low state, and the PERST input being in a high state.

15. The system of claim 10, wherein the memory device, to selectively initiate the first data storing operation or the second data storing operation, are configured to initiate the second data storing operation based on PLN signal transitioning to a low state, the PERST signal being in a high state, and the PERST input being in a high state.

16. The system of claim 10, wherein the memory device, to selectively initiate the first data storing operation or the second data storing operation, are configured not to initiate the first data storing operation or the second data storing operation based on the PLN signal being in a high state and the PERST signal being in a low state.

17. The system of claim 10, wherein the memory device, to selectively initiate the first data storing operation or the second data storing operation, are configured not to initiate the first data storing operation or the second data storing operation based on the PLN signal being in a high state and the PERST signal being in a high state.

18. A method performed by a memory device, comprising:

receiving a peripheral component interconnect power loss notification (PLN) signal and a peripheral component interconnect express reset (PERST) signal,
  wherein the PERST signal is output from a logic component to the memory device based on an emergency power fail input and a PERST input;
determining whether to initiate an emergency power fail operation or a forced quiescence operation based on the PERST signal,
  wherein the PERST signal is sampled on a falling edge of the PLN signal; and
initiating the emergency power fail operation or the forced quiescence operation.

19. The method of claim 18, wherein initiating the emergency power fail operation or the forced quiescence operation comprises initiating the emergency power fail operation based on the PLN signal transitioning to a low state and the PERST signal being in a low state.

20. The method of claim 18, wherein initiating the emergency power fail operation or the forced quiescence operation comprises initiating the forced quiescence operation based on the PLN signal transitioning to a low state, the PERST signal being in a high state, and the PERST input being in a high state.

* * * * *